May 6, 1952  P. H. MORGANSON  2,595,870

SELF-STARTING DIRECT-CURRENT MOTOR

Filed Aug. 8, 1950  2 SHEETS—SHEET 1

Inventor
Peter H. Morganson
By
*Seymour, Carle & Nichols*
Attorneys

May 6, 1952  P. H. MORGANSON  2,595,870
SELF-STARTING DIRECT-CURRENT MOTOR
Filed Aug. 8, 1950  2 SHEETS—SHEET 2

Inventor
Peter H. Morganson
By
Seymour, Earle & Nichols
Attorneys

Patented May 6, 1952

2,595,870

UNITED STATES PATENT OFFICE 2,595,870

SELF-STARTING DIRECT-CURRENT MOTOR

Peter H. Morganson, Winsted, Conn., assignor to The William L. Gilbert Clock Corporation, Winsted, Conn., a corporation of Connecticut Application August 8, 1950, Serial No. 178,203

10 Claims. (Cl. 172—36)

1

The present invention relates to electric motors and relates more particularly to self-starting direct-current motors, i. e., direct-current motors which will automatically start from an at-rest condition upon the application of suitable current thereto.

The self-starting electric motors of the present invention are primarily designed for use in small sizes in connection with the driving of instruments, toys and the like, although available for other uses.

One of the main objects of the present invention is to provide a simple, reliable and low cost direct-current motor which will self-start without requiring the employment of stator pole-saliencies which are non-concentric with the rotor or otherwise of an unusual shape.

Another object of the present invention is to provide a superior direct-current motor which will self-start when energized by direct current without requiring the employment of a wound rotor.

A further object of the present invention is to provide a simple, reliable and low cost direct-current motor which will effectively start a simple permanent-magnet rotor.

Other objects and advantages will appear to those skilled in the art from the following, considered in conjunction with the accompanying drawings.

In the accompanying drawings, in which certain modes of carrying out the present invention are shown for illustrative purposes:

Figure 1:
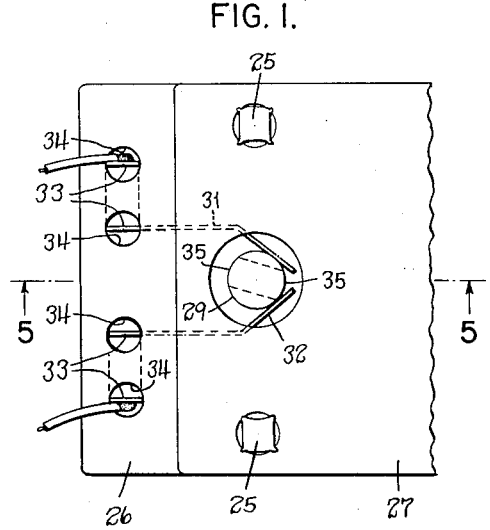
Fig. 1 is a top or plan view of one form which a self-starting direct-current motor may assume in accordance with the present invention.

The particular self-starting direct-current motor chosen for illustration in the accompanying drawings for purposes of making clear a preferred embodiment of the present invention, includes a pair of complemental U-shaped pole-pieces, respectively generally designated by the reference characters 10 and 11 and formed of soft iron or equivalent low-hysteresis magnetic material.

The pole-piece 10 is relatively short in a direction axially of the motor and includes a cross-plate 12 from the respective opposite ends of which upwardly extend similar complemental arms 13—13 integral with the said cross-plate. The said arms are curved transversely, as is especially well indicated in Fig. 6, and each is slitted or otherwise formed to provide what may be aptly termed a "major" pole-salient 14 and a companion "minor" pole-salient 15. In the present instance, the upper ends of the pole-saliencies 14 and 15 are integrally connected by means of a web 16.

Each of the major pole-saliencies 14 above referred to has a circumferential dimension or width materially exceeding the similar dimension of its companion minor pole-salient 15. In practice, each major pole-salient 14 should exceed in circumferential dimension the similar dimension of its companion minor pole-salient 15 by at least 25% and preferably in the order of 200% or more, for reasons as will hereinafter appear.

Figure 5:
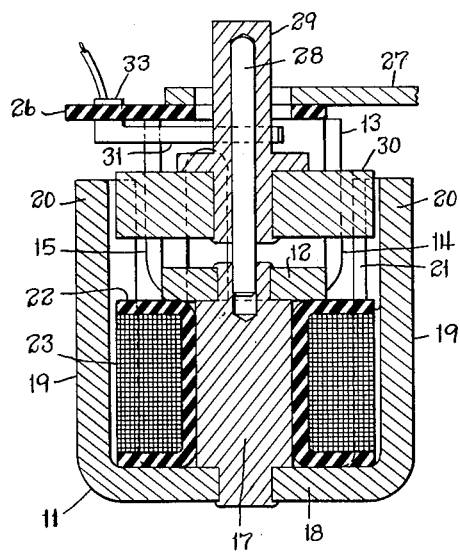
Fig. 5 is a central-longitudinal sectional view taken on the line 5—5 of Fig. 1.

The central portion of the cross-plate 12 of the pole-piece 10 is riveted or otherwise rigidly secured to the upper end of an axially-arranged cylindrical core 17, as is especially well shown in Fig. 5. At its lower end, the said core is riveted or otherwise rigidly secured to the cross-plate 18 of the pole-piece 11, and like the latter is formed of soft iron or other suitable magnetic material. The said pole-piece 11 is relatively long in a direction axially of the motor and also includes two similar upwardly-extending complemental arms 19—19 respectively integral with the opposite outer ends of the said cross-plate 18 and transversely curved as shown.

Figure 6:
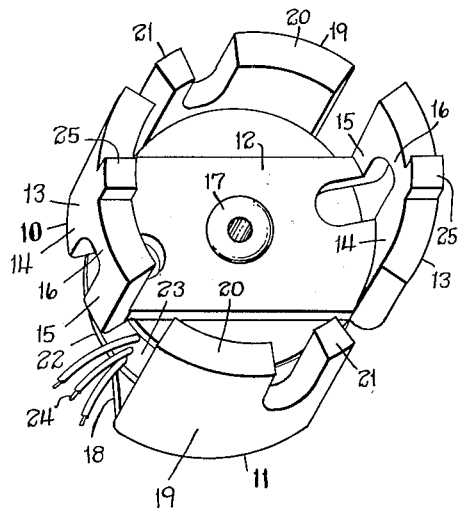
Fig. 6 is a perspective view of the field-structure detached.

The respective upper ends of the arms 19—19 above referred to are notched or bifurcated to provide each thereof with a major pole-salient 20 and a companion minor pole-salient 21, all as is especially well shown in Fig. 6. Each of the said major pole-saliencies 20 just referred to has a circumferential dimension or width materially exceeding the similar dimension of its complemental minor pole-saliencies 21. As before noted in connection with the pole-saliencies 14 and 15, it is preferred in practice that each of the major pole-saliencies 20 should exceed in circumferential dimension or width, the similar dimension of its companion minor pole-saliencies 21 by at least 25% and preferably in the order of 200% or more.

Figure 7:
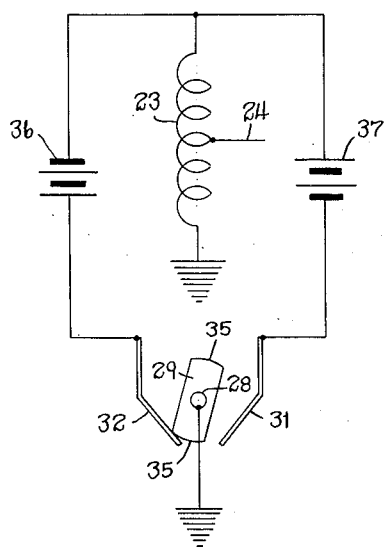
Fig. 7 is a diagrammatic view showing one mode of energizing the motor by means of direct current.
Figure 8:
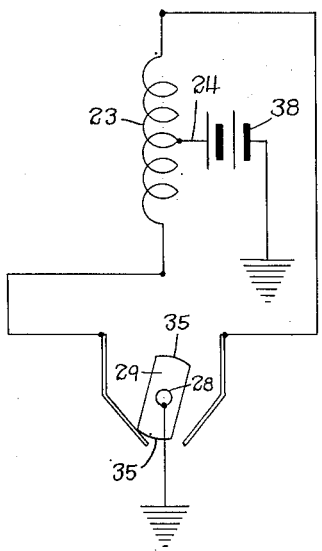
Fig. 8 is a view similar to Fig. 7 but showing still another mode of energizing the motor with direct current.

Fitting over the core 17 previously referred to, is a spool or bobbin 22 formed of insulating material (Fig. 5), so as to be confined between the cross-plates 12 and 18 respectively of the pole-pieces 10 and 11. Wound upon the spool or bobbin 22 is an energizing-coil 23 which is shown in axial section in Fig. 5 and which is schematically indicated in Figs. 7 and 8. Preferably and as is indicated in Figs. 7 and 8, the said energizing-coil, in addition to having the usual terminal-leads, is preferably also provided with a center-tap 24 which may be utilized in a manner as will hereinafter appear.

Each of the arms 13—13 of the pole-piece 10 is provided with one of two similar upwardly-projecting integral attaching-fingers 25—25. The said attaching-fingers are respectively located at diametrically-opposite locations on the structure, and both thereof extend upwardly through the adjacent portions of both an insulating-plate 26 and a mounting-plate 27. The insulating-plate 26, in the instance shown, is located below the mounting-plate 27, and the respective upper ends of the attaching-fingers 25—25 are staked over the upper face of the said mounting-plate (Fig. 1), to firmly attach both the latter and the said insulating-plate 26 to the stator structure. The said mounting-plate may be utilized to secure the entire motor structure to an instrument.

Extending upwardly from and coaxially with the core 17 before referred to, is a bearing-stud 28 which is preferably drive-fitted into the upper end of the core 17 so as to be rigid therewith, all as indicated in Fig. 5. Mounted upon the upper portion of the bearing-stud 28 with capacity for turning movement thereon, is a bearing-sleeve 29 having its upper end projecting through both the insulating-plate 26 and the mounting-plate 27 and preferably formed of brass, aluminum or other suitable nonmagnetic material. As indicated in Fig. 5, the upper end of the bearing-sleeve 29 is closed and rests upon the spherically-contoured upper end of the bearing-stud 28. The projecting upper end of the bearing-stud 28 may be utilized in any suitable manner to drive a device or instrument, while the lower end of the said bearing-sleeve has rigidly mounted upon it a rotor 30.

Figure 3:
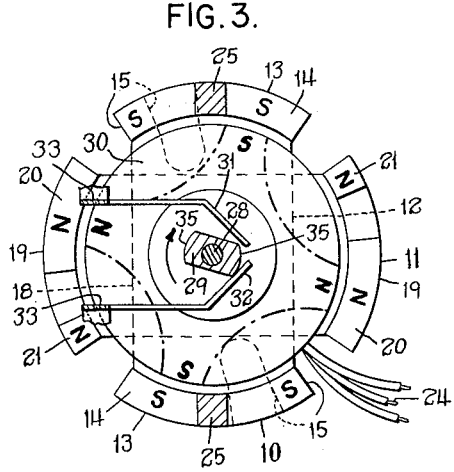
Fig. 3 is a transverse sectional view taken on the line 3—3 of Fig. 2.
Figure 2:
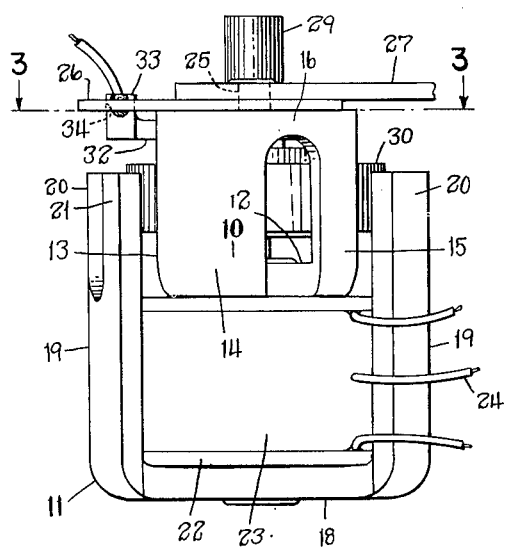
Fig. 2 is an edge view thereof.
Figure 4:
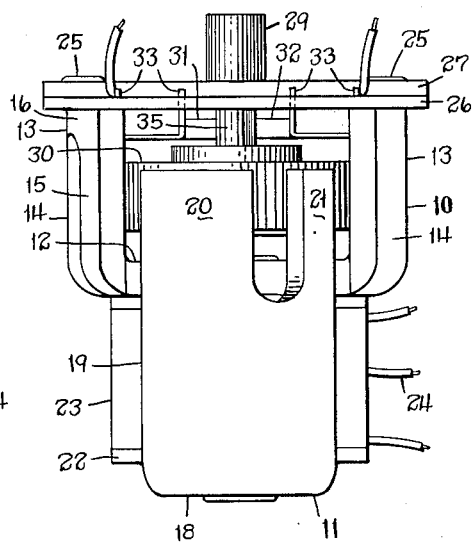
Fig. 4 is an elevational view viewing the structure at a right angle from the showing of Fig. 2.

The rotor 30 is formed of permanent-magnet material such, for instance, as Alnico, cobalt steel, or hardened carbon steel having the necessary magnetic-retentivity. In the present instance, the rotor 30 has a circular perimeter and is preferably so magnetized as to be provided in effect, with four magnetic-poles respectively of alternate opposite polarities, as is indicated in Fig. 3. For convenience of illustration, the said magnetic-poles are schematically outlined by dot-and-dash lines in Fig. 3.

The rotor 30 above referred to is so positioned in an axial direction as to have its periphery opposite the pole-salients 14, 15, 20 and 21, and as before noted, the arms 13—13 and 19—19, together with their respective pole-salients, are transversely curved so as to have their inner surfaces substantially equidistant from the periphery of the rotor 30 or its equivalent, all as is especially well indicated in Fig. 3.

Extending immediately beneath the insulating-plate 26 and above the rotor 30, is a pair of complemental brushes 31 and 32 which may be conveniently formed of spring brass, Phosphor bronze, or the like. The outer portion of each of the brushes 31 and 32 is formed with two upwardly-extending mounting-fingers 33—33, which may be force-fitted into apertures 34 formed in the portion of the insulating-plate 26 which projects beyond the mounting-plate 27, as is especially well indicated in Fig. 1. The said mounting-fingers may, if desired, be staked, and form a convenient terminal to which lead-wires may be soldered or otherwise secured.

The main portions of the flexible brushes 31 and 32 are respectively inturned toward each other at their ends and are sequentially adapted to be engaged (twice for each revolution of the rotor 30) by diametrically-opposite commutating-lobes 35—35 formed on the portion of the bearing-sleeve 29 which is in registration with the main flexible reaches of the brushes 31 and 32. In the present instance, the so-called "commutating-lobes" 35—35 may be conveniently produced by milling or otherwise cutting away opposite sides of the portion of the bearing-sleeve 29 lying directly above the rotor 30 and as will be apparent by reference to Fig. 3 in particular. It is to be noted that the inturned terminal-ends of the brushes 31 and 32 are so located with respect to the commutating-lobes 35—35 that a given one of the said lobes engages only one of said brushes at a given time.

One mode of supplying electrical energy to the motor structure above described, is indicated in Fig. 7 wherein two electric batteries 36 and 37 respectively have one of their terminals connected to the brush 32 and the brush 31. It will be noted by reference to Fig. 7, that the said batteries are reversed with respect to each other so that one brush is given a negative polarity and the other a positive polarity.

In the wiring scheme indicated in Fig. 7, the center-tap 24 of the energizing-coil 23 may be ignored, inasmuch as it is not made use of under the present circumstances.

Now when one of the commutating-lobes 35 of the bearing-sleeve 29 is engaged with one of the brushes, the current-flow through the energizing-coil 23 will be in one direction, whereby each of the two major pole-salients 14 and each of their complemental minor pole-salients 15 will have one magnetic polarity imparted thereto, while at the same time each of the major pole-salients 20 and their companion minor pole-salients 21 will have an opposite magnetic-polarity imparted thereto, to thus cause the rotor 30 or its equivalent to turn in the direction indicated by the arrow in Fig. 3. The direction of rotation will be such that a given magnetic-pole of the rotor 30 will move from a given minor pole-salient toward the companion major pole-salient thereof. It will be noted that this direction of rotation under the present conditions is opposite to that which would be the case were the minor pole-salients 15—15 or 21—21 to be provided with shading-coils.

The self-starting characteristics and operation of the motor illustrated in the accompanying drawings and above described may best be understood if it is assumed that when the energizing-coil 23 is not supplied with current, the magnetic-poles of the rotor 30 will tend to substantially centralize themselves with respect to the major pole-salients of the stator, as is indicated in Fig. 3.

It may now be further assumed that, with the poles of the rotor 30 positioned as indicated in Fig. 3, when the current supply is turned on, the major pole-salients 14—14 and their respective companion minor pole-salients 15—15 will each have south magnetic-polarities temporarily imparted thereto by the energizing-coil 23, and the major pole-saliencs 20—20 and their respective companion minor pole-salients 21—21 will each have north magnetic-polarities imparted thereto.

Under the conditions just above described, each of the major pole-salients will tend to repulse the adjacent pole of similar sign on the rotor 30, but this repulsion will be mainly in a radial direction and hence may impart but a slight turning tendency, if any, to the rotor. Under these conditions, however, each minor pole-salient will also be exerting a repulsion effect on the pole of the rotor of similar sign, and this unbalance will tend to turn the rotor in a clockwise direction as viewed in Fig. 3. While the repulsion actions just referred to are taking place, the minor pole-salients will be attracting the poles of opposite sign on the rotor 30, and hence exert a turning effect on the said rotor.

As the rotor turns, the commutating-lobes 35—35 on the bearing-sleeve 29 will also turn and ultimately the polarities above referred to in the various major and minor pole-salients will reverse and the rotation of the rotor will be continued, but always in a direction wherein a given pole of the rotor 30 will move from a given minor pole-salient to the companion major pole-salient of the latter.

If desired, a single battery such as the battery 33 indicated in Fig. 8, may be connected to the center-tap 24 of the energizing-coil 23 and the respective opposite ends of the said coil 23 may be connected to the brushes 31 and 32, in the manner indicated in Fig. 8. Under these conditions, the rotation of the commutating-lobes 35—35 will cause the current in the energizing-coil 23 to reverse, and hence will impart the desired polarities to the pole-pieces 10 and 11 in basically the same manner as was described in connection with the wiring diagram of Fig. 7.

While the rotor 30 of the described exemplary motor runs clockwise as viewed in Fig. 3, the same may readily be made to run in the opposite direction by simply reversing the brushes 31 and 32, for instance, in which case the major pole saliencs 14 and 20 and their respective minor pole saliencs 15 and 21 will have imparted thereto polarities which are opposite to the polarities of the then adjacent poles of the rotor. Accordingly, assuming that the major pole salients 14 and 20 and their respective minor pole salients 15 and 21 have, in the angular position of the rotor in Fig. 3, polarities opposite to those indicated in the latter figure, the poles of the rotor will then be attracted toward the effective centers of the then adjacent pole salients 14 and 20 and their respective minor salients 15 and 21, with the result that the rotor will start counterclockwise as viewed in Fig. 3. Immediately after thus starting the rotor, the commutating lobes 35 of the bearing sleeve 29 will cause a reverse current flow in the energizing coil 23 and according reversal of the polarities of the major pole salients 14 and 20 and their respective minor pole salients 15 and 21, thus sending the rotor on its further way toward normal counterclockwise rotation as viewed in Fig. 3.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A self-starting direct-current motor, including in combination: a rotor formed of permanent-magnet material and having on its periphery at least two poles of opposite polarities respectively; a field-structure having at least two pairs of pole-salients located adjacent the periphery of said rotor and constructed and arranged to impress magnetic flux thereon respectively of opposite instantaneous polarities, each of said pairs of pole-salients comprising a major pole-salient and a minor pole-salient spaced circumferentially from each other and said major and minor pole-salients follow each other alternately in circumferential direction, each of said major pole-salients having a circumferential dimension which exceeds the similar dimension of its adjacent companion minor pole-salient; an energizing-coil for said field-structure; and means including a commutator driven by said rotor to automatically reverse the direction of flow of direct current through said energizing-coil in such progressive angular positions of said rotor that said pairs of pole-salients apply unidirectional starting and driving torque to said rotor.

2. A self-starting direct-current motor, including in combination: a rotor formed of permanent-magnet material and having on its periphery at least two poles of opposite polarities respectively; a field-structure having at least two pairs of pole-salients located adjacent the periphery of said rotor and constructed and arranged to impress magnetic flux thereon respectively of opposite instantaneous polarities, each of said pairs of pole-salients comprising a major pole-salient and a minor pole-salient spaced circumferentially from each other and said major and minor pole-salients follow each other alternately in circumferential direction, each of the said major pole-salients having a circumferential dimension which exceeds the similar dimension of its adjacent companion minor pole-salient by at least 25%; an energizing-coil for the said field-structure; and means including a commutator driven by said rotor to automatically reverse the direction of flow of direct current through said energizing-coil in such progressive angular positions of said rotor that said pairs of pole-salients apply unidirectional starting and driving torque to said rotor.

3. A self-starting direct-current motor, including in combination: a rotor formed of permanent-magnet material and having on its periphery a plurality of pairs of poles with said poles alternately of opposite polarities; a field-structure having at least four pairs of pole-salients located adjacent the periphery of said rotor to impress magnetic flux thereon and constructed and arranged so that a given one of said pairs of pole-salients alternate with another pair of opposite instantaneous polarity around said rotor, each of the said pairs of pole-salients comprising a major pole-salient and a companion pole-salient spaced circumferentially from each other and said major and minor companion pole-salients follow each other alternately in circumferential direction, each of said major pole-salients having a circumferential dimension which exceeds the similar dimension of its adjacent companion minor pole-salient; and energizing-coil for said field-structure; and means including a commutator driven by said rotor to automatically reverse the direction of flow of direct current through said energizing-coil in such progressive angular positions of said rotor that said pairs of pole-salients apply unidirectional starting and driving torque to said rotor.

4. A self-starting direct-current motor, including in combination: a rotor formed of permanent-magnet material and having on its periphery a plurality of pairs of poles with said poles alternately of opposite polarities; a field-structure having at least four pairs of pole-salients located adjacent the periphery of said rotor to impress magnetic flux thereon and constructed and arranged so that a given one of said pairs of pole-salients alternates with another pair of opposite instantaneous polarity around said rotor, each of the said pairs of pole-salients comprising a major pole-salient and a minor companion pole-salient spaced circumferentially from each other and said major and minor companion pole-salients follow each other alternately in circumferential direction, each of the said major pole-salients having a circumferential dimension which exceeds the similar dimension of its adjacent companion minor pole-salient by at least 25%; an energizing-coil for said field-structure; and means including a commutator driven by said rotor to automatically reverse the direction of flow of direct current through said energizing-coil in such progressive angular positions of said rotor that said pairs of pole-salients apply unidirectional starting and driving torque to said rotor.

5. A self-starting direct-current motor, including in combination: a rotor formed of permanent-magnet material and having on its periphery at least two poles of opposite polarities respectively; a field-structure including at least two complemental U-shaped pole-pieces respectively of opposite instantaneous polarities, each of said pole-pieces having both of its side-arms extending adjacent the periphery of said rotor and each of said side-arms being divided into a pair of pole-salients, each of the said pairs of pole-salients comprising a major pole-salient and a minor companion pole-salient spaced circumferentially from each other and said major and minor companion pole-salients follow each other alternately in circumferential direction, each of said major pole-salients having a circumferential dimension which exceeds the similar dimension of its adjacent companion minor pole-salient; an energizing-coil for said field-structure; and means including a commutator driven by said rotor to automatically reverse the direction of flow of direct current through said energizing-coil in such progressive angular positions of said rotor that said pairs of pole-salients apply unidirectional starting and driving torque to said rotor.

6. A self-starting direct-current motor, including in combination: a rotor formed of permanent-magnet material and having on its periphery at least two poles of opposite polarities respectively; a field-structure including at least two complemental U-shaped pole-pieces respectively of opposite instantaneous polarities, each of said pole-pieces having both of its side-arms extending adjacent the periphery of said rotor and each of said side-arms being divided into a pair of pole-salients, each of said pairs of pole-salients comprising a major pole-salient and a minor companion pole-salient spaced circumferentially from each other and said major and minor companion pole-salients follow each other alternately in circumferential direction, each of said major pole-salients having a circumferential dimension which exceeds the similar dimension of its adjacent companion minor pole-salient by at least 25%; an energizing-coil for said field-structure; and means including a commutator driven by said rotor to automatically reverse the direction of flow of direct current through said energizing-coil in such progressive angular positions of said rotor that said pairs of pole-salients apply unidirectional starting and driving torque to said rotor.

7. A self-starting direct-current motor, including in combination: a rotor formed of permanent-magnet material and having on its periphery a plurality of pairs of poles with said poles alternately of opposite polarities; a field-structure including at least two complemental U-shaped pole-pieces respectively of opposite instantaneous polarities, each of said pole-pieces having both of its side-arms extending adjacent the periphery of said rotor and each of said side-arms being divided into a pair of pole-salients, each of said pairs of pole-salients comprising a major pole-salient and a minor companion pole-salient spaced circumferentially from each other and said major and minor companion pole-salients follow each other alternately in circumferential direction, each of said major pole-salients having a circumferential dimension which exceeds the similar dimension of its adjacent companion minor pole-salient; an energizing-coil for said field-structure; and means including a commutator driven by said rotor to automatically reverse the direction of flow of current through said energizing-coil in such progressive angular positions of said rotor that said pairs of pole-salients apply unidirectional starting and driving torque to said rotor.

8. A self-starting direct-current motor, including in combination: a rotor formed of permanent-magnet material and having on its periphery a plurality of pairs of poles with said poles alternately of opposite polarities; a field-structure including at least two complemental U-shaped pole-pieces respectively of opposite instantaneous polarities, each of said pole-pieces having both of its side-arms extending adjacent the periphery of said rotor and each of said side-arms being divided into a pair of pole-salients, each of said pairs of pole-salients comprising a major pole-salient and a minor companion pole-salient spaced circumferentially from each other and said major and minor companion pole-salients follow each other alternately in circumferential direction, each of said major pole-salients having a circumferential dimension which exceeds the similar dimension of its adjacent companion minor pole-salient by at least 25%; an energizing-coil for said field-structure; and means including a commutator driven by said rotor to automatically reverse the direction of flow of direct current through said energizing-coil in such progressive angular positions of said rotor that said pairs of pole-salients apply unidirectional starting and driving torque to said rotor.

9. A self-starting direct-current motor, including in combination: a rotor formed of permanent-magnet material and having on its periphery at least two poles of opposite polarities respectively; a field-structure including a magnetic-core, a relatively-deep U-shaped pole-piece secured to one end of said core and having complemental side-arms extending adjacent the periphery of said rotor, a relatively-shallow complemental U-shaped pole-piece secured to the opposite end of said core and also having its two side-arms extending adjacent the periphery of said rotor, said side-arms of the pole-pieces each being divided into a pair of pole-salients, each of said pairs of pole-salients comprising a major pole-salient and a minor companion pole-salient spaced circumferentially from each other and said major and minor companion pole-salients follow each other alternately in circumferential direction, each of said major pole-salients having a circumferential dimension which exceeds the similar dimension of its adjacent companion pole-salient; an energizing-coil encircling said core; and means including a commutator driven by said rotor to automatically reverse the direction of flow of direct current through said energizing-coil in such progressive angular positions of said rotor that said pairs of pole-salients apply unidirectional starting and driving torque to said rotor.

10. A self-starting direct-current motor, including in combination: a rotor formed of permanent-magnet material and having on its periphery a plurality of pairs of poles with said poles alternately of opposite polarities; a field-structure including a magnetic-core, a relatively-deep U-shaped pole-piece secured to one end of said core and having complemental side-arms extending adjacent the periphery of said rotor, a relatively-shallow complemental U-shaped pole-piece secured to the opposite end of said core and also having two side-arms extending adjacent the periphery of said rotor, said side-arms of the pole-pieces each being divided into a pair of pole-salients, each of said pairs of pole-salients comprising a major pole-salient and a minor companion pole-salient spaced circumferentially from each other and said major and minor companion pole-salients follow each other alternately in circumferential direction, each of said major pole-salients having a circumferential dimension which exceeds the similar dimension of its adjacent companion pole-salient; an energizing-coil encircling said core; and means including a commutator driven by said rotor to automatically reverse the direction of flow of direct current through said energizing coil in such progressive angular positions of said rotor that said pairs of pole-salients apply unidirectional starting and driving torque to said rotor.

PETER H. MORGANSON.

REFERENCES CITED

The following references are of record in the file of this patent:

UNITED STATES PATENTS

| Number | Name | Date |
| --- | --- | --- |
| 1,966,897 | Lofgren | July 17, 1934 |
| 2,457,637 | Brailsford | Dec. 28, 1948 |
| 2,511,698 | Dickey | June 13, 1950 |